Feb. 5, 1957 N. W. McLEOD 2,780,266
MULTI-CHAMBERED VEHICLE TIRE
Filed Nov. 13, 1952 4 Sheets-Sheet 1
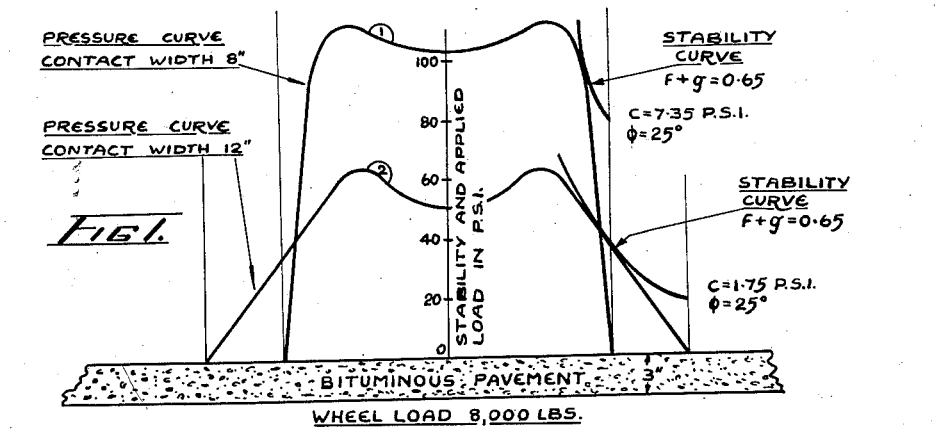
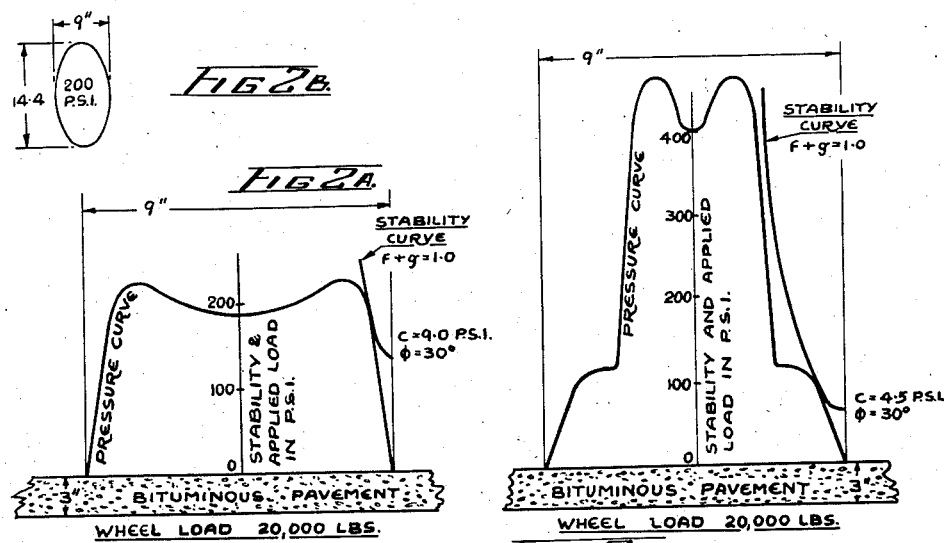
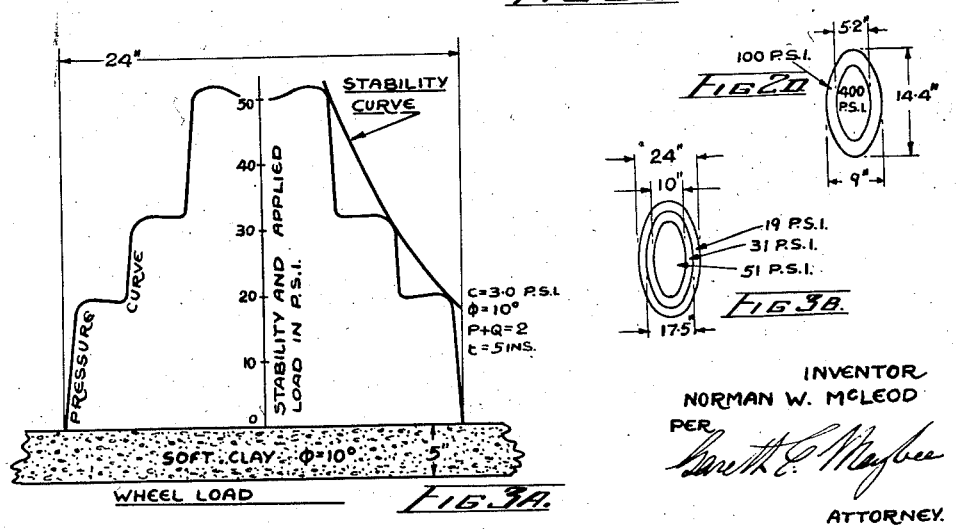
INVENTOR
NORMAN W. McLEOD
PER
ATTORNEY.

Feb. 5, 1957   N. W. McLEOD   2,780,266
MULTI-CHAMBERED VEHICLE TIRE
Filed Nov. 13, 1952   4 Sheets-Sheet 2

INVENTOR
NORMAN W. McLEOD
PER
ATTORNEY.

Feb. 5, 1957 N. W. McLEOD 2,780,266
MULTI-CHAMBERED VEHICLE TIRE
Filed Nov. 13, 1952 4 Sheets-Sheet 3

INVENTOR
NORMAN W. McLEOD
PER

ATTORNEY

Feb. 5, 1957 N. W. McLEOD 2,780,266
MULTI-CHAMBERED VEHICLE TIRE
Filed Nov. 13, 1952 4 Sheets-Sheet 4
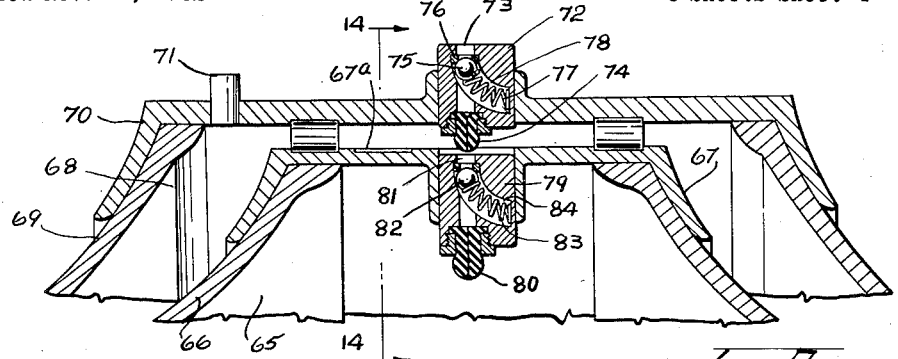
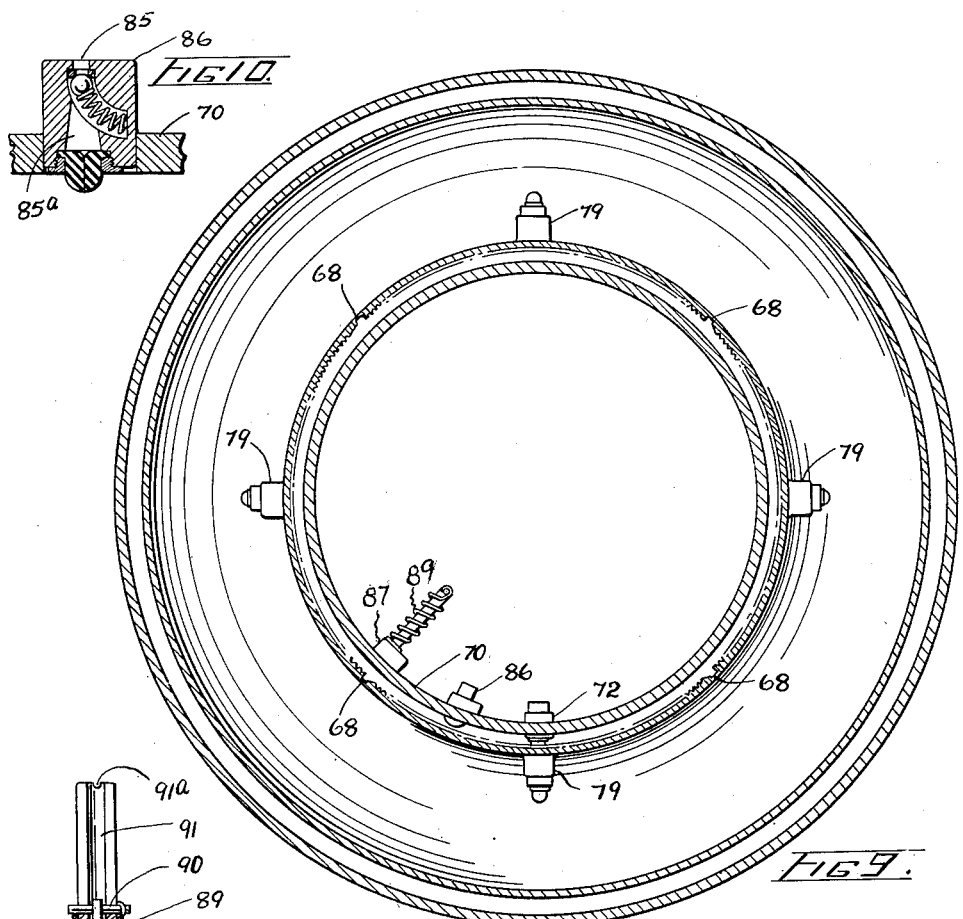
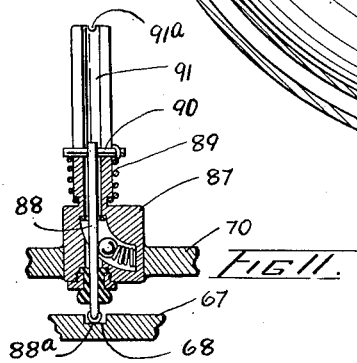
INVENTOR
NORMAN W. McLEOD
PER
ATTORNEY.

United States Patent Office 2,780,266
Patented Feb. 5, 1957

2,780,266

MULTI-CHAMBERED VEHICLE TIRE

Norman W. McLeod, Oakville, Ontario, Canada

Application November 13, 1952, Serial No. 320,199

7 Claims. (Cl. 152—340)

This invention relates to vehicle tires, and the object of the invention is to design a tire that will facilitate the movement of vehicles over natural or prepared surfaces, accelerate the compaction of soils, aggregates, paving, and similar materials, and increase their density, and enable vehicles to travel over less expensive prepared surfaces without damaging the surfaces than is the case with conventional tires.

Horses and other beasts of burden have in modern times been replaced by self-propelled wheeled vehicles that are generally less mobile over soft terrain, which limits the use of such vehicles. By the use of the present invention, a vehicle of predetermined load may move or be moved over less stable surfaces much easier than has heretofore been possible. The effectiveness of the compaction of soils and similar materials by pneumatic tires is limited by the necessity for relating the tire pressure to the bearing capacity of the material. Because the present invention makes possible the use of higher tire pressures over at least part of the contact area for the compaction of any given material, both the speed of compaction and the density of the compacted material may be increased. The invention has application to the design and construction of pavements for highways and airports. For example, to accommodate the increasing tire pressures applied to flexible pavements by aircraft, it has been necessary to constantly increase the stability of bituminous paving mixtures. By the use of the invention hereinafter described, this trend may be halted, or reversed.

The invention is explained and illustrated by reference to the accompanying graphs and diagrams in which:

Figure 1 is a graph illustrating the influence of the shape of the curve of tire pressure distribution across the contact area on the design of a bituminous pavement for a wheel load of eight thousand pounds at an average pressure in Case (1) of about one hundred pounds per square inch and in Case (2) of about fifty pounds per square inch;

Figure 2A is a similar graph for a wheel load of twenty thousand pounds under an average pressure of about two hundred pounds per square inch for a standard pneumatic tire.

Figure 2B is a diagram showing pressure on the contact area of a tire under the load illustrated in Figure 2A.

Figure 2C is a graph similar to that shown in Figure 2A, but illustrating a bituminous pavement design for a two-compartment tire in accordance with this invention in which the inner compartment is under pressure of about four hundred pounds per square inch and the outer compartment is under pressure of about one hundred pounds per square inch.

Figure 2D is a graph showing pressures on the contact area of a tire under the load illustrated in Figure 2C.

Figure 3A is a graph illustrating the influence of tire design on vehicle mobility over soft clay of limited thickness for a wheel load of twenty thousand nine hundred pounds using a three-compartment tire in accordance with this invention in which the inner compartment is inflated to a pressure of fifty-one pounds per square inch, the next compartment is inflated to a pressure of thirty-one pounds per square inch, and the outer compartment is inflated to a pressure of nineteen pounds per square inch.

Figure 3B is a graph showing pressures on the contact area of a tire under the load illustrated in Figure 3A.

Figure 4A:
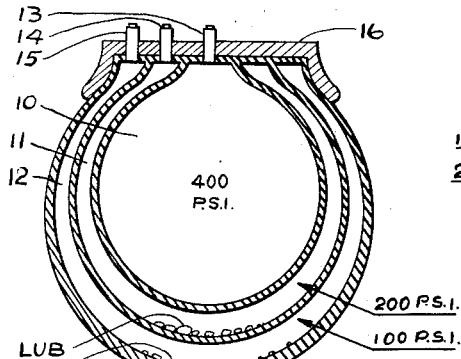

Figure 4A is a diagrammatic cross-section through a tire constructed in accordance with this invention in which the inner compartment is inflated to a pressure of four hundred pounds per square inch, the next compartment is inflated to a pressure of two hundred pounds per square inch, and the outer compartment is inflated to a pressure of one hundred pounds per square inch.

Figure 4B:
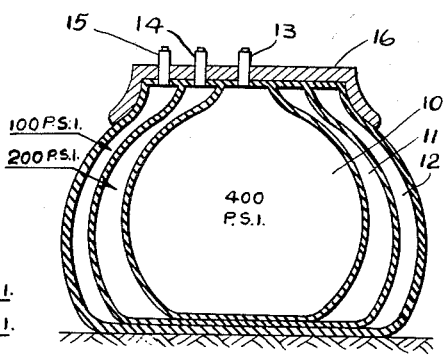

Figure 4B is a diagrammatic cross-section similar to 4A showing the approximate shape of the same tire under load.

Figure 4C:
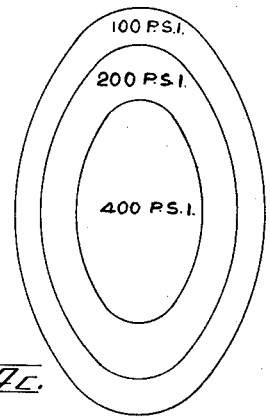

Figure 4C is a graph showing pressures on the contact area of the tire illustrated in Figure 4B.

Figure 5A:
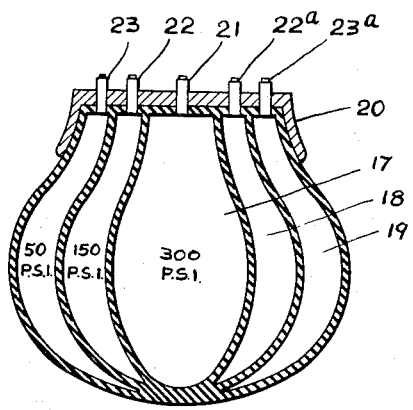

Figure 5A is a diagrammatic cross-section of a three-compartment tire in which the walls of the compartments are connected adjacent the periphery of the tire and in which the inner compartment is inflated to a pressure of three hundred pounds per square inch and the next compartment is inflated to a pressure of one hundred and fifty pounds per square inch, and the outer compartment is inflated to a pressure of fifty pounds per square inch.

Figure 5B:
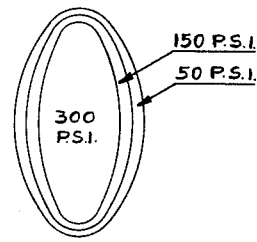

Figure 5B is a graph showing pressures on the contact area when the tire illustrated in Figure 5A is under load.

Figure 6:
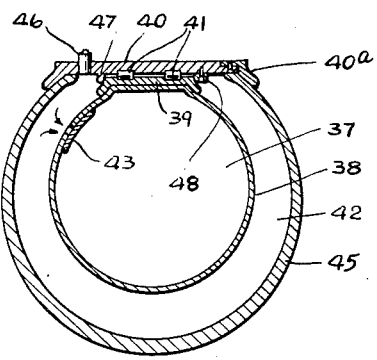

Figure 6 is a diagrammatic cross-section of a tire in accordance with this invention comprising two inflated compartments, the inner compartment being rotatable relative to the outer compartment to accommodate slippage between the two compartments.

Figure 7:
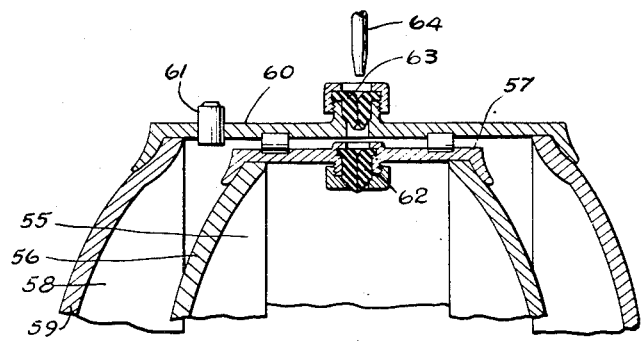

Figure 7 is a diagrammatic cross-section of a tire similar to Figure 6 partly broken away and showing an alternative means for inflating the inner compartment.

Figure 8 is a diagrammatic cross-section on a larger scale of a tire similar to Figure 6 partly broken away, and showing an alternative means for inflating the inner compartment.

Figure 9 is a diagrammatic circumferential section of a tire shown in Figure 7, on a smaller scale than Figure 7.

Figure 10 is a diagrammatic cross-section on the same scale as Figure 7 of a check valve through which a pry may be inserted to rotate the rim of the inner compartment relative to that of the outer compartment for the tire illustrated in Figures 8 and 9.

Figure 11 is a diagrammatic cross-section of a pin operating through a check valve for the purpose of stopping the rotation of the rim of the inner compartment at the point where the inflation valves of the outer and inner rims are directly opposite each other.

In the specification and claims the term "normal load" means the load which the tire is designed by the manufacturer to carry; and "normal pressure" means the resistance of the tire to compression, in the case of a pneumatic tire the pressure to which the tire is designed to be inflated under normal load.

Generally speaking, this invention consists of so constructing a tire that the average slope of the curve of tire pressure is flattened in the general vicinity of the edge of the contact area of the tire with the contacted surface when the tire is running on a substantially flat unyielding surface under normal load and at normal pressure (see Fig. 1), and this is achieved broadly by constructing the tire so that the pressure of the tire tends to be substantially higher adjacent to the centre of the contact area than the tire pressure adjacent to the edges of the contact area, the pressure thus being graduated from the centre portion to the edges. If necessary, the contact area and the average pressure over the contact area can be made substantially the same as the normal pressure for a tire of conventional construction designed to support the same total load but having a more nearly constant application of pressure over the whole contact area (see Figures 2A, 2B, 2C and 2D).

Specifically, according to this invention, the tire comprises a central compressible annular compartment and a more compressible annular compartment on both sides of the central compartment, the compressibility of said compartments relative to each other and to the contemplated load on the tire being such that the pressure applied by said tire to a contacted surface when the tire is running on a susbtantially flat unyielding surface under normal load and at normal pressure is greater at the central portion of the contact area than adjacent to the edges of the contact area. For example, the invention contemplates two hollow annular tubes or bodies, each of which is inflated, the gas pressure in the outer body being less than the gas pressure in the inner body, whereby when the tire is under load the inner body will engage the inner surface of the outer body at the central portion of the contact area of the outer body with the contacted surface.

Inasmuch as the results obtained are improved when the pressure is graduated from the centre portion to the edges of the contact area, the invention contemplates the provision of a number of more or less concentric bodies each applying successively lower pressure to the contact area from the centre to the edge of the contact area. Alternatively, these bodies may be arranged side by side, the central body being less compressible than the outer bodies.

The theoretical background which led to this invention is described in my papers, "The rational design of bituminous paving mixture," published in the Proceedings of the Highway Research Board, volume 29 (1949); "A rational approach to the design of bituminous paving mixtures," published in the Proceedings of The Association of Asphalt Paving Technologists, volume 19 (1950); and "Application of Triaxial Testing to the design of bituminous pavements," American Society for Testing Materials, Special Technical Publication No. 106 (1950).

These papers indicate that a layer of soft soil resting on a layer of firmer soil, or a bituminous pavement placed on a stable base course, may fail by being squeezed out between the tire and the firm material beneath. As these layers approach failure by squeezing out, they deevlop frictional resistance at the boundary between the layer and the tire, and at the boundary between the layer and the underlying firm material. Analysis of this situation by means of well-known principles of soil mechanics indicates that these two fractional resistances make it possible to apply a materially higher tire pressure near the centre of the contact area of the tire on the layer than near the edge of the contact area, without causing the layer to fail, Figure 1. The strength or stability of this layer at any point on the contact area between the tire and the layer can be calculated at least approximately by means of one or more mathematical equations, of which the following are representative:

$$V = 2c\sqrt{\frac{1+\sin\phi}{1-\sin\phi}} + 2cK\sqrt{\frac{1+\sin\phi}{1-\sin\phi}}\left(\frac{1+\sin\phi}{1-\sin\phi}\right) + \frac{d}{t}V'(f+g)\left(\frac{1+\sin\phi}{1-\sin\phi}\right) \quad (1)$$

$$V = 2c\sqrt{\frac{1\sin\phi}{1-\sin\phi}} + 2cK\sqrt{\frac{1\sin\phi}{1-\sin\phi}}\left(\frac{1\sin\phi}{1-\sin\phi}\right) + \frac{d}{t}(P+Q)(c+V'\tan\phi)\left(\frac{1+\sin\phi}{1-\sin\phi}\right) \quad (2)$$

where $V$ = stability in p. s. i. developed by the layer at any point on the contact area $c$ = cohesion in p. s. i. for the material of the layer as measured by the direct shear or triaxial test $\phi$ = angle of internal friction for the material of the layer as measured by the direct shear or triaxial test $K$ = a constant that still remains to be evaluated accurately, but which can apparently be taken equal to unity for conservative design $f$ = coefficient of friction between layer and tire $g$ = coefficient of friction between layer and the firm material beneath $d$ = distance in inches from the edge to any point on the contact area where the stability V is required $t$ = thickness of the layer in inches $V'$ = the average vertical pressure in p. s. i. exerted by the tire between the edge of the contact area and the point on the contact area where the stability V is required $P$ = ratio of the frictional resistance $fV$ between layer and tire to the shearing resistance of the layer represented by the Coulomb equation $s=c+V \tan \phi$, and therefore has a maximum value of unity $Q$ = ratio of the frictional resistance $gV$ between layer and material beneath to the shearing resistance, $s=c+V \tan \phi$, of either the layer or the material beneath the layer, whichever is the lesser, and therefore has a maximum value of unity In general, Equation 1 can be employed when the frictional resistances $fV$ and $gV$ are known to be less than the shearing resistance of either the layer or of the material beneath the layer. Equation 2 should be employed when the frictional resistance $fV$ tends to be equal to or greater than the shearing resistance of the layer, and when the frictional resistance $gV$ tends to be equal to or greater than either the shearing resistance of the layer or the shearing resistance of the underlying material, whichever is the lesser, and in this case the value used for both P and Q should be unity.

Tests have shown that the pressure applied to a surface by a standard pneumatic vehicle tire under load is substantially constant over the entire contact area. To be more accurate, the pressure curve has been shown to rise rapidly from zero pressure at the edge of the contact area to two peaks, and then diminishes somewhat from there towards the center, as shown in Figures 1, 2A, and 2C, the peaks being considered to be due to the influence of the side walls of the tire. Current standard pneumatic tires cannot, therefore, take advantage of the gradually and frequently rapidly increasing stability developed by a loaded layer of soil, aggregate, bituminous pavement, etc., between the edge and centre of the contact area of the tire on the layer.

For more efficient loading of any such layer, it appears that the pressure exerted by the tire at all points on the contact area should approximate, but not exceed, the stability developed by the layer at each of these points; that is, the tire should apply the highest pressure to the central portion of the contact area, and a gradually diminishing pressure from the centre toward the edge of the contact area. This cannot be accomplished by current single compartment pneumatic tires, but could be approximated by the use of the multi-chambered or multi-compartment tires that are the object of this invention.

For most effective tire loading, the inflation pressure of each compartment of a multi-compartment tire should be such that it approaches as closely as possible, but does not seriously exceed, the stability or bearing capacity of the layer of soft soil, aggregate, bituminous pavement, etc., at any point on the contact area of the tire on the layer. The contact area tends to be overloaded at all points where the tire pressure distribution curve is above the stability curve. It is necessary, therefore, to determine the stability of the layer at all points on the contact area. This can be shown in the form of a stability curve (see Figures 1, 2A, 2C, and 3A), the position of which can be located either experimentally or at least approximately by means of Equations 1 and 2 previously given. However, when the material of the layer to be loaded has a positive value for the angle of internal friction $\varphi$, the location of the stability curve varies somewhat with the position of the pressure distribution curve. Consequently, it is necessary to determine the positions of both the stability curve and the tire pressure distribution curve by a process of trial and error, for which Equations 1 and 2 are employed. The simultaneous adjustment of the location of both curves until they are just tangent to each other can be accomplished quite rapidly by this method.

The following steps outline a method based on Equations 1 and 2 for calculating the inflation pressure to be employed in each compartment of a multi-compartment tire, for effectively traversing a softer layer of material resting on a firmer layer, using Figures 2A, 2B, 2C, 2D, 3A and 3B for illustration:

1. The average values for cohesion $c$ and angle of internal friction $\varphi$ of the soft soil layer, aggregate layer, or bituminous pavement layer, etc. are determined by means of a triaxial compression or direct shear test. If the $c$ and $\varphi$ values are not measured, they must be assumed, preferably on the basis of experience. (If the underlying material tends to be weaker than the material of the layer, its $c$ and $\varphi$ values should also be determined.)

2. In the case of a bituminous pavement, the coefficient of friction $f$ between pavement and tire, and the coefficient of friction $g$ between pavement and base must be either measured or assumed.

3. The stability V of the layer at the edge of the contact area can be calculated by substituting the measured values for $c$ and $\varphi$ in the first two terms on the right hand side of Equations 1 and 2, $$2c\sqrt{\frac{1+\sin\phi}{1-\sin\phi}}+2ck\sqrt{\frac{1+\sin\phi}{1-\sin\phi}}\left(\frac{1+\sin\phi}{1-\sin\phi}\right)$$

and neglecting the third term.

4. Proceeding inward from the edge of the contact area, the positions of points on the stability curve, e. g. Figures 2C and 3A, representing values of stability V for corresponding points on the contact area, can be calculated by means of the third term on the right hand side of either Equation 1 or Equation 2. In each case, the value determined for this third term is added to the stability value found previously for the layer at the edge of the contact area. By drawing a smooth line through these points, the position of the complete stability curve is located.

5. The tire pressure distribution curve should be drawn tangent to the stability curve. The number and position of the points of tangency of the two curves will depend on the number of compartments to be selected for the tire, and their position within the tire. The number of compartments will be limited by the practical considerations of tire construction, and the position of the compartments within the tire will normally tend to be established so as to provide the most practically effective tire loading, e. g. Figure 3A.

6. Since the position of the stability curve is influenced by the position of the tire pressure distribution curve, the location of both must be established by trial and error, employing Equations 1 and 2, until they are tangent to each other, e. g. Figure 3A.

7. Equations 1 and 2 are based upon a loaded strip of great length, whereas the longitudinal axis of the elliptical contact area of a tire resting on a surface is relatively short. In this respect, therefore, the stability curves given by Equations 1 and 2 should tend to be conservative. On the other hand, discrepancies often occur between the conclusions indicated by theoretical soil mechanics, and the practical results obtained when the same principles are applied in the field, due to our imperfect knowledge of soil mechanics at the present time. Consequently, experimental work may indicate that the stability values given by Equations 1 and 2 are too optimistic and cannot be duplicated in practice. On the other hand, in Figures 2A, 2C and 3A, it has been assumed that the tire pressure distribution curve must be either tangent to or below the stability curve for all points on the contact area. Actual practice may indicate that the tire pressure distribution curve may somewhat exceed the stability curve over part of the contact area without serious detriment, because either the excessive load is of short duration, or the excess of stress in the locally overstressed area or areas can be relieved without injury by plastic flow toward sections that are understressed.

The principles just described and illustrated by Figures 2C, 2D, 3A and 3B, can be employed for the more effective compaction of soils, aggregates, bituminous mixtures and similar materials, in which a loose layer of material usually resting on a firm material is to be compacted to high density. Insofar as the mobility of vehicles over a soft layer of material underlain by firm material, and the design of bituminous pavements, is concerned, the use of multi-compartment tires becomes more effective in general as the thickness of the layer is decreased. The advantages of the multi-compartment tire decrease as the thickness of the layer increases, and become negligible when the thickness of the layer becomes large in comparison with the dimensions of the tire contact area on the layer. When this ratio is large enough, a multi-compartment tire has no advantage over a single-compartment tire, insofar as effectiveness of tire loading for a given size of contact area is concerned.

A multi-compartment tire according to this invention may consist of two or more annular compartments by means of which the highest pressure can be applied to the central portion of the tire contact area with lower pressures being applied toward the edge of the contact area. The multi-compartment tire may be of several different constructions to accomplish this objective, of which the following are examples.

*Example 1*

This multi-chambered or multi-compartment tire construction is illustrated by Figures 4A, 4B, and 4C, and consists of three gas-filled annular compartments 10, 11 and 12 within a single tire, each compartment being inflated to a different pressure by means of separate suitable valve equipped filling openings or valve stems 13, 14 and 15. As shown, the inner compartment is inflated to the highest pressure and the outermost compartment to the lowest. When the multi-compartment tire illustrated is under load, the pressures applied to the contact area would be approximately as shown in Figure 4C, in which the highest pressure is applied to the central portion, and the lowest pressure on the outside. In the diagrams the inner compartment is shown as inflated to 400 lbs. per square inch, the middle compartment to 200 lbs. per square inch and the outer compartment to 100 lbs. per square inch.

The multi-compartment tire is mounted on a suitable rim 16. The walls of the compartments are attached to each other to form a common bead. The tire as illustrated is what is commonly called a tubeless tire, that is to say no separate inner tube is provided in the compartments, but it will be understood that the drawing is diagrammatic and does not disclose details of construction and that the tire will be constructed in accordance with good tire construction practice, including the necessary fabric reinforcing and tread for the outer casing.

As will be observed from Figure 4B the walls of the inner compartments are substantially non-expensible, or at least sufficiently non-expansible to avoid equalization of the pressure in the tire. A substantially non-expansible tire wall can be made in accordance with standard tire construction by the use of reinforcing fabric or otherwise, and therefore no special construction need be described or illustrated in the drawings which are purely diagrammatic.

When the multi-chambered tire is under normal load so that the wall of an inner compartment will engage the inner surface of the wall of an adjacent outer compartment (Figure 4B), because the circumference of any inner compartment is shorter than the circumference of an outer compartment, Figure 4A, the circumference of the inner compartment will tend to have a greater angular velocity than the circumference of the outer compartment as the wheel to which the tire is attached rotates. The ratio of the angular velocities of the two circumferences will tend to be inversely proportional to their diameters. Because of the different angular velocities of the two circumferences, the circumference of an inner compartment will tend to skid or slide on the circumference of the adjacent outer compartment, if both compartments are attached to the same rim, bead, or tire wall. The detrimental effect on the tire due to this skidding or sliding tendency may be relieved by the use of a lubricant (marked LUB. in Figure 4A) between the two surfaces, of which examples are powdered graphite, certain synthetic lubricating oils that do not attack either natural or synthetic rubber, or petroleum lubricating oils that do not affect synthetic rubber, when the tire is constructed of the latter material.

Example 2

This multi-compartment tire construction is illustrated by Figures 5A and 5B. It consists of three gas-filled annular compartments 17, 18 and 19 within a single tire which is mounted on a rim 20. Each compartment is inflated to a different pressure, the inner compartment being inflated to the highest pressure and the outer compartment to the lowest. For this tire construction, the walls of the compartments are connected substantially at the center line of the periphery of the tire dividing the outer and intermediate compartments into two parts. Consequently, the circumferences of all compartments rotate at the same angular velocity. Each compartment can be inflated to the required pressure by its separate valve stem 21, 21, 22ª, 23 and 23ª.

When the multi-compartment tire illustrated in Figure 5A is underload, the pressures applied to the contact area will be approximately as shown in Figure 5B, in which the highest pressure is applied to the central portion, and the lowest pressure on the outside. It will be observed from Figure 5B, that this method of tire construction will result in a much steeper slope to the curve of tire pressure distribution near the edge of the contact area in the direction of the longitudinal than in the direction of the transvese axis of the contact area. While theoretical soil mechanics indicates that for the same average slope of the tire pressure curve near the edge of the contact area, considerably greater pressure is needed to squeeze out a layer of material from under a tire in the direction of the longitudinal than of the transverse axis of the contact area, the steeper slope of the tire pressure curve near the edge of the contact area on its longitudinal axis given by this multi-compartment tire construction, may make it less effective as far as tire loading, soil compaction, vehicle mobility, and pavement design are concerned, than that described under Example 1.

Example 3

In connection with Example 1, Figure 4A, it has been jointed out that because the circumference of any inner compartment is shorter than the circumference of an outer compartment, the circumference of the inner compartment will tend to have a greater angular velocity than the circumference of the outer compartment as the wheel to which the tire is attached rotates, whereby the circumference of an inner compartment will tend to skid or slide on the circumference of the adjacent compartment, if both compartments are attached to the same rim bead or tire wall.

In Figure 6 is shown a construction in which the inner compartment is mounted on a rim which will rotate relative to the rim on which the outer compartment is mounted, thus accommodating the relative movement of the two compartments without any skidding or sliding of the inner compartment relative to the outer compartment. The inner compartment 37 is formed by a wall or casing 38 mounted on an inner rim 39 which is rotatably mounted on outer rim 40 through the medium of needle bearings 41. Rim 40 is fixed in any usual way to a wheel (not shown). The inner compartment 37 has an opening into the outer compartment 42 provided with a suitable flap valve normally closed 43 for inflating the inner compartment 37 to a higher pressure than the outer compartment 42. The outer compartment is enclosed by a wall 45 which fits on rim 40 and is provided with a valve stem 46 having a suitable valve therein and extending through the rim 40 for inflation of the outer compartment to a lower pressure than the inner compartment.

To enable the rim 39 to be inserted, the outer rim 40 is shown as having a removable flange 40ª, and to retain the inner rim 39 in position, lugs or flanges 47 and 48 are formed on the inner surface of the outer rim 40, the lug 48 being shown as removable to permit insertion of the inner rim.

To inflate the tire, gas pressure is applied through valve stem 46. Flap valve 43 will open to admit air to compartment 37. When both compartments have been inflated to the pressure desired for the central compartment, application of pressure is discontinued, and the valve in valve stem 46 is relieved to reduce the pressure of the outer compartment to the desired lower pressure than the inner compartment. Flap valve 43 is closed when pressure ceases to be applied to the outer compartment, and remains closed acting as a check valve when the pressure of the outer compartment is reduced and maintaining the inner compartment at a higher pressure.

Example 4

In Figure 7 is shown a construction in which an inner compartment is rotatably mounted relative to an outer compartment and in which means is provided for directly inflating the inner compartment. As shown in this figure, the inner compartment 55 is formed by a thin resilient substantially non-expansible casing 56 and is mounted on rim 57. The outer compartment 58 is formed of a tough thin resilient casing 59 and is mounted on outer rim 60. The inner rim rotates relative to the outer rim as in the previous examples. An ordinary valve in valve stem 61 is provided for inflating the outer compartment to the desired pressure. For inflating the inner compartment there is provided in rim 57 a rubber check valve 62 comprising a body of soft rubber material slit through the middle. A similar valve 63 is provided in the outer rim 60. The inner compartment 55 may be inflated by inserting a hollow stem or needle 64 through the two valves and into the inner compartment 55 and applying air or other gas under pressure through the stem 64. The soft rubber of the valves 62 and 63 will close around the stem and prevent escape of air during inflation and after inflation has taken place. After the inner compartment 55 has been inflated the pressure of air will force the parts of the valve 62 together preventing escape of air from the compartment. Similarly, air in the outer compartment will act on the valve 63 causing it to close and retain the air which is in the outer compartment.

To bring the valves 62 and 63 into register the stem or needle 64 or some similar instrument may be inserted through the valve 63 until its end engages the inner rim 57 and by a prying action the inner rim 57 can be rotated relative to the outer rim until the two valves are in register. It can readily be determined when the valves are in register by the fact that the stem 64 or other instrument will enter the valve 62.

*Example 5*

It may be desirable to have more positive acting valves and more positive means for bringing the valves into alignment or register. Means for doing this is illustrated diagrammatically in Figures 8, 9, 10 and 11.

In Figure 8 is shown an arrangement similar to that shown in Figure 6 comprising an inner compartment 65 formed of a thin resilient casing 66 and mounted on an inner rim 67. Outer inflated compartment 68 is formed by a tough thin casing 69 and is mounted on outer rim 70. The outer compartment is inflatable by means of a standard valve in valve stem 71.

The inner compartment is inflatable by means of valves in the outer and inner rims, each of which is of substantially the same construction. The valve 72 in the outer rim is provided with an aperture 73 closed at its lower end by valve 74 similar to the valve disclosed in Figure 11. A ball 75 is adapted to seat on the seat 76 in the aperture 73 and is normally pressed against said seat by a spring 77. When an inflating stem or needle is inserted into the aperture 73, the ball 75 will be depressed in a diagonal guide-way 78 to permit passage of the instrument.

The valve 79 in the inner rim 67 is similarly constructed having a rubber valve 80 closing the lower end of aperture 81 and a ball 82 pressed by spring 83 in guide-way 84.

The inner compartment is inflated by inserting a needle or stem through the passage-ways 73 and 81.

To bring the valves into alignment a prying opening 85 may be provided as shown in Figure 10. This prying opening is provided with a valve 86 similar to the valves 72 and 79 already described. The prying opening is mounted on the outer rim 70 as shown in Figure 9, and the opening 85 flares outwardly at 85a shown in Figure 10, so that a pointed instrument may be inserted through the opening 85 until it engages the inner rim, and by a prying action the inner rim can be moved relative to the outer rim. Illustrated in Figure 8 is a roughened or knurled surface 67a on the inner rim opposite the prying opening 85 so as to facilitate engagement of the prying instrument with the surface of the inner rim. As shown in Figure 9 four valves 79 are provided on the inner rim so that if the valves on the inner and outer rim are not close to one another at the time when it is desired to inflate the inner compartment, it is only necessary to rotate the inner rim relative to the outer rim until one of the four valves in the inner rim is in register or alignment with the valve in the outer rim.

To positively locate the relative positions of the valve in the outer rim and the valves in the inner rim there may be provided a spring pressed pin device such as is shown in Figure 11. This is mounted on the outer rim 70 and is provided with a valve 87 similar to the valves 72, 79 and 86. The pin 88 passes through the valve and engages the inner rim 67 which inner rim is provided at intervals with a depression 68 into which the pin 88 will spring when the outer inflating valve 72 is in alignment with one of the four inner inflating valves 79. To facilitate movement of the spring pin 88 over the inner rim 67, a rotatable wheel or ball 88a may be provided as shown in Figure 11.

A coil expansion spring 89 engages a pin 90 which projects from the outer end of the spring pin 88, tending to press the spring pin 88 downwardly against the inner rim 67. The transverse pin 90 extends through slots in the side of a vertical hollow stem 91 having a transverse groove 91a at its upper end. By lifting the transverse pin 90 to the top of the stem 91 and turning it 90 degrees the transverse pin 90 will fit in the groove 91a and hold the pin 88 out of contact with the rim 67.

The word "rubber" is intended to include synthetic rubber and other rubber like compositions having the qualities of strength and resilience necessary to support the loads contemplated by this invention.

The relative compressibility of the compartments of the tire is of the essence of this invention. This is accomplished by inflating by a compressible gas contained in a substantially non-expansible casing.

What I claim as my invention is:

1. A vehicle wheel including a rim and a multi-chambered pneumatic tire mounted thereon, said tire comprising at least two inflated resilient annular compartments supported by the rim one within the other and each compartment having substantially non-expansible walls, the side walls of the outer compartment being spaced from the side walls of the inner compartment and the outer compartment being inflated to a lower pressure than the inner compartment, said compartments being so constructed and arranged and inflated to such pressure that when the tire runs in contact with a substantially flat unyielding surface under normal load and at normal pressures the wall of the inner compartment will engage the inner surface of the wall of the outer compartment at the central portion of the contact area of the outer compartment with the surface on which the tire is running, whereby the pressure applied by said tire to said surface is greater at the central portion of the contact area than adjacent the perimeter of the contact area.

2. A vehicle wheel as claimed in claim 1 in which the walls of the inner and outer compartments are joined together substantially at the center line of the periphery of the tire.

3. A vehicle wheel as claimed in claim 1 in which means is provided for independently inflating the compartments.

4. A vehicle wheel as claimed in claim 1 comprising at least three annular compartments.

5. A vehicle wheel as claimed in claim 1 in which a lubricant is provided in the compartment to facilitate slippage between the walls thereof when same are in contact when the tire is under load.

6. A vehicle wheel as claimed in claim 1 in which the outer compartment is mounted directly on the rim and the inner compartment is mounted on a separate rim supported by but rotatable relative to the first-mentioned rim.

7. A vehicle wheel as claimed in claim 1 in which the outer compartment is mounted directly on the rim but the inner compartment is mounted on an inner rim supported by but rotatable relative to the first-mentioned rim, and in which the rims are each provided with a valve for inflating the inner compartment, the valve of the outer rim being adapted to register with the valve of the inner rim.

References Cited in the file of this patent

UNITED STATES PATENTS

| | | |
|---|---|---|
| 837,458 | Fairchild | Dec. 4, 1906 |
| 1,081,010 | Breitung | Dec. 9, 1913 |
| 1,215,717 | Ruthven | Feb. 13, 1917 |
| 1,433,643 | Overlander | Oct. 31, 1922 |
| 1,506,161 | Caldwell | Aug. 26, 1924 |
| 1,696,707 | Booth | Dec. 25, 1928 |
| 1,788,335 | Schneider | Jan 6, 1931 |

FOREIGN PATENTS

| | | |
|---|---|---|
| 397,829 | Great Britain | 1933 |